US012212067B2

(12) United States Patent
Zhang et al.

(10) Patent No.: US 12,212,067 B2
(45) Date of Patent: Jan. 28, 2025

(54) ANTENNA, METHOD FOR MANUFACTURING AN ANTENNA AND COMMUNICATION SYSTEM

(71) Applicants: Beijing BOE Technology Development Co., Ltd., Beijing (CN); BOE TECHNOLOGY GROUP CO., LTD., Beijing (CN)

(72) Inventors: Dongdong Zhang, Beijing (CN); Qianhong Wu, Beijing (CN); Yafei Zhang, Beijing (CN); Yali Wang, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/778,487

(22) PCT Filed: Jun. 3, 2021

(86) PCT No.: PCT/CN2021/098073

§ 371 (c)(1),
(2) Date: Dec. 8, 2022

(87) PCT Pub. No.: WO2022/252170

PCT Pub. Date: Dec. 8, 2022

(65) Prior Publication Data

US 2024/0154323 A1 May 9, 2024

(51) Int. Cl.
*H01Q 1/38* (2006.01)
*H01Q 1/52* (2006.01)
*H01Q 21/08* (2006.01)

(52) U.S. Cl.
CPC ............... *H01Q 21/08* (2013.01); *H01Q 1/38* (2013.01); *H01Q 1/52* (2013.01)

(58) Field of Classification Search
CPC .. H01Q 1/22; H01Q 1/38; H01Q 1/48; H01Q 1/50; H01Q 1/52; H01Q 21/00;
(Continued)

(56) References Cited

U.S. PATENT DOCUMENTS 11,075,455 B2 * 7/2021 Lu ........................ H01Q 9/0407
11,095,028 B2 * 8/2021 Ting ......................... H01Q 9/16
(Continued)

FOREIGN PATENT DOCUMENTS

CN 202817194 U 3/2013
CN 104577318 A 4/2015
(Continued)

OTHER PUBLICATIONS

Liu et al., "A novel low profile dual polarization antenna," Electronics World, Jun. 23, 2016, p. 36. English Abstract.
(Continued)

*Primary Examiner* — Tho G Phan
(74) *Attorney, Agent, or Firm* — HOUTTEMAN LAW LLC

(57) ABSTRACT

The present disclosure provides an antenna, a method for manufacturing an antenna and a communication system. The antenna includes: a dielectric layer; a first electrode having at least one first opening therein; at least one radiating structure on a side of the dielectric layer different from that with the first electrode thereon; an orthographic projection of the radiating structure on the dielectric layer is located in that of the first opening on the dielectric layer; each radiating structure includes a second electrode and a third electrode, orthographic projections of the second and third electrodes on the dielectric layer are located in that of the first opening on the dielectric layer, the orthographic projections of the
(Continued)

second and third electrodes on the dielectric layer are not overlapped; at least one first feed line and at least one second feed line.

20 Claims, 4 Drawing Sheets

(58) Field of Classification Search
CPC ........ H01Q 21/06; H01Q 21/08; H01Q 21/24; H01Q 21/28
See application file for complete search history.

(56) References Cited

U.S. PATENT DOCUMENTS

| | | | | |
|---|---|---|---|---|
| 11,228,103 | B2 * | 1/2022 | Wang | H01Q 1/50 |
| 11,721,911 | B2 * | 8/2023 | Chiu | H01Q 21/065<br>343/867 |
| 11,876,308 | B2 * | 1/2024 | Zhang | H01Q 9/0407 |
| 11,973,267 | B2 * | 4/2024 | Li | H01Q 1/38 |
| 11,978,942 | B2 * | 5/2024 | Jia | H01Q 3/36 |

FOREIGN PATENT DOCUMENTS

| | | | |
|---|---|---|---|
| CN | 106876983 | A | 6/2017 |
| CN | 109244659 | A | 1/2019 |
| CN | 110534890 | A | 12/2019 |
| CN | 111033892 | A | 4/2020 |
| CN | 111293435 | A | 6/2020 |
| CN | 111430919 | A | 7/2020 |
| CN | 111710970 | A | 9/2020 |
| CN | 111755812 | A | 10/2020 |
| EP | 831548 | A3 | 4/1998 |

OTHER PUBLICATIONS

Wang, Chen, "Research and design of miniaturized and high isolation mimo antennas," Master's Thesis, Univ. Electronic Sci. & Tech. of China, Sep. 15, 2018, Sichuan, China. English Abstract.

Kang, Le, "Research on smart skin antenna and miniaturized antenna for wireless communications," Doctoral Dissertation, Xidian Univ., Jan. 15, 2019, Xi'an, Shaanxi, China. English Abstract.

* cited by examiner

ANTENNA, METHOD FOR MANUFACTURING AN ANTENNA AND COMMUNICATION SYSTEM

TECHNICAL FIELD

The present disclosure relates to the field of communication technology, and particularly relates to an antenna, a method for manufacturing an antenna and a communication system.

BACKGROUND

Compared with the 4$^{th}$ generation mobile communication technology (4G), the 5$^{th}$ generation mobile networks (5G) has the advantages of higher data rate, larger network capacity, lower time delay and the like. The frequency band of 5G includes two parts, namely a low frequency band and a high frequency band, where the low frequency band (3 GHz-6 GHz) has good propagation characteristics and very abundant spectrum resources, so that the development of antenna units and antenna arrays for communication applications in the low frequency band gradually becomes a research hotspot at present.

Based on the practical application scenarios of the 5G mobile communication, a 5G low frequency-band antenna should have technical features such as high gain, miniaturization, and wide frequency band. A microstrip antenna is a commonly used antenna which has a simple structure, and is favourable to forming an array and can realize an antenna form with a high gain, but the application of the microstrip antenna in the 5G low-frequency mobile communication is restricted by its narrow bandwidth and large size in the low-frequency band.

SUMMARY

The present disclosure is directed to solve at least one technical problem in the related art and provides an antenna, a method for manufacturing an antenna and a communication system.

In a first aspect, an embodiment of the present disclosure provides an antenna, which includes:

a dielectric layer;

a first electrode arranged on the dielectric layer and provided with at least one first opening therein;

at least one radiating structure arranged on the dielectric layer and located on a side of the dielectric layer different from that with the first electrode thereon; each radiating structure includes a second electrode and a third electrode, where orthographic projections of the second electrode and the third electrode on the dielectric layer are located in an orthographic projection of the first opening on the dielectric layer, and the orthographic projection of the second electrode on the dielectric layer is not overlapped with the orthographic projection of the third electrode on the dielectric layer;

at least one first feed line and at least one second feed line which are arranged on the dielectric layer and are located on a side of the dielectric layer different from that with the first electrode thereon; the first feed line is configured to feed power to the second electrode, the second feed line is configured to feed power to the third electrode, and a feeding direction of the first feed line is different from a feeding direction of the second feed line.

In some implementations, at least one of the first electrode, the second electrode, and the third electrode includes a metal mesh structure.

In some implementations, the antenna further includes a fourth electrode arranged in a floating state and arranged on a side of the dielectric layer away from the first electrode; an orthographic projection of each fourth electrode on the dielectric layer is located in the orthographic projection of the first opening corresponding thereto on the dielectric layer, and an extension in a length direction of the orthographic projection of the fourth electrode on the dielectric layer divides the orthographic projection of the first opening on the dielectric layer into a first area and a second area; orthographic projections of the first electrode and the second electrode on the dielectric layer are respectively located in the first area and the second area.

In some implementations, the second electrode, the third electrode and the fourth electrode are arranged in a same layer.

In some implementations, the fourth electrode includes a metal mesh structure.

In some implementations, the second electrode and the third electrode, with the orthogonal projections thereof on the dielectric layer being located in the orthogonal projection of the first opening on the dielectric layer, the first opening, and the first feed line connected to the second electrode and the second feed line connected to the third electrode constitute a radiating element; the radiating structure includes at least one radiating element;

the first opening is rectangular, and for each radiating element, a line connecting a center of the second electrode and a center of the third electrode is parallel to one of diagonal lines of the first opening.

In some implementations, for each radiating element, a ratio of a length of the line connecting the center of the second electrode and the center of the third electrode to a length of the one of the diagonal lines of the first opening ranges from 0.2 to 0.6.

In some implementations, the first opening includes a first side and a second side which are opposite to each other, and a third side and a fourth side which are opposite to each other; the first side, the second side, the third side and the fourth side of the first opening each include a first endpoint and a second endpoint which are opposite to each other;

for each radiating element, an orthographic projection of the first side of the first opening on the dielectric layer intersects with an orthographic projection of the first feed line on the dielectric layer at a first intersection point; an orthographic projection of the third side of the first opening on the dielectric layer intersects with an orthographic projection of the second feed line on the dielectric layer at a second intersection point;

a ratio of a distance between an orthographic projection of the first endpoint of the first side of the first opening on the dielectric layer and the first intersection point to a distance between an orthographic projection of the second endpoint of the first side of the first opening on the dielectric layer and the first intersection point ranges from 0.1 to 1.1;

a ratio of a distance between an orthographic projection of the first endpoint of the third side of the first opening on the dielectric layer and the second intersection point to a distance between an orthographic projection of the second endpoint of the third side of the first opening on the dielectric layer and the second intersection point ranges from 0.1 to 1.1.

In some implementations, the second electrode and the third electrode each are rectangular, the second electrode and the third electrode each include a first side, a second side, a third side, and a fourth side, and the first side, the second side, the third side and the fourth side of each of the second electrode and the third electrode are respectively parallel with the first side, the second side, the third side and the fourth side of the first opening.

In some implementations, at least one of the first feed line and the second feed line is a microstrip line, and a feeding direction of one of the first feed line and the second feed line is a vertical direction and a feeding direction of the other of the first feed line and the second feed line is a horizontal direction.

In some implementations, the antenna further includes a first feeding structure and a second feeding structure, the first feeding structure and the second feeding structure both are located on a second surface of the dielectric layer, and an orthographic projection of the first feeding structure on the dielectric layer at least partially overlaps with an orthographic projection of the first feed line on the dielectric layer, and an orthographic projection of the second feeding structure on the dielectric layer at least partially overlaps with an orthographic projection of the second feed line on the dielectric layer.

In some implementations, the first feeding structure and the first feed line are located in a same layer and are electrically connected to each other; the second feeding structure and the second feed line are located in a same layer and are electrically connected to each other.

In some implementations, a plurality of the first opening are provided, and the number of the first openings is $2^n$, a first feeding unit includes n stages of third feed lines, and a second feeding unit includes n stages of fourth feed lines;

each of the third feed lines at a first stage is connected with two adjacent first feed lines, and different ones of the third feed lines at the first stage are connected with different first feed lines; each of the third feed lines at an $m^{th}$ stage connects two adjacent third feed lines at an $(m-1)^{th}$ stage, and different ones of the third feed lines at the $m^{th}$ stage are connected with different ones of the third feed lines at the $(m-1)^{th}$ stage;

each of the fourth feed lines at the first stage is connected with two adjacent second feed lines, and different ones of the fourth feed lines at the first stage are connected with different second feed lines; each of the fourth feed lines at the $m^{th}$ stage is connected with two adjacent fourth feed lines at the $(m-1)^{th}$ stage, different ones of the fourth feed lines at the $m^{th}$ stage are connected with different ones of the fourth feed lines at the $(m-1)^{th}$ stage; where n is greater than or equal to 2, m is greater than or equal to 2 and less than or equal to n, and both m and n are integers;

at least one of the third feed line and the fourth feed line is a microstrip line.

In some implementations, the first electrode includes a main body portion, a first branch, and a second branch, the first branch and the second branch are respectively connected to two sides of the main body portion in a length direction; the antenna further includes a fifth feed line and a sixth feed line; the fifth feed line is connected with the first feeding structure, and an orthographic projection of the fifth feed line on the dielectric layer is located in an orthographic projection of the first branch on the dielectric layer; the sixth feed line is connected with the second feeding structure, and an orthographic projection of the sixth feed line on the dielectric layer is located in an orthographic projection of the second branch on the dielectric layer;

an extending direction of the fifth feed line (i.e., a direction in which the fifth feed line extends) is perpendicular to an extending direction of the sixth feed line (i.e., a direction in which the sixth feed line extends), and an included angle between the fifth feed line and the first feed line is 45°.

In some implementations, the antenna is divided into a feed region and a radiation region; the first feeding structure and the second feeding structure are located in the feed region; the radiating structure is located in the radiation region; the first electrode further has at least one second opening located in the feed region; an orthographic projection of the second opening on the dielectric layer is not overlapped with orthographic projections of the first feeding structure and the second feeding structure on the dielectric layer.

In some implementations, the dielectric layer is a single-layer structure and made of polyimide or polyethylene terephthalate.

In some implementations, the dielectric layer includes a first dielectric sub-layer, a first bonding layer, and a second dielectric sub-layer which are sequentially stacked;

the first electrode is arranged on a side, away from the first bonding layer, of the first dielectric sub-layer; the second electrode is arranged on a side, close to the first sub-first dielectric layer, of the first bonding layer; and the third electrode is arranged on a side, away from the first bonding layer, of the second dielectric sub-layer.

In some implementations, a material of the first dielectric sub-layer and/or the second dielectric sub-layer includes polyimide or polyethylene terephthalate.

In a second aspect, an embodiment of the present disclosure provides a method for manufacturing an antenna, including:

providing a dielectric layer;

forming a pattern including a first electrode on a side of the dielectric layer through a patterning process, where a first opening is formed in the first electrode;

forming at least one radiating structure, at least one first feed line and at least one second feed line on a side of the dielectric layer opposite to that formed with the first electrode; each radiating structure includes a second electrode and a third electrode, where orthographic projections of the second electrode and the third electrode on the dielectric layer are located in an orthographic projection of the first opening on the dielectric layer, and the orthographic projection of the second electrode on the dielectric layer is not overlapped with the orthographic projection of the third electrode on the dielectric layer; the first feed line is configured to feed power to the second electrode, the second feed line is configured to feed power to the third electrode, and a feeding direction of the first feed line is different from a feeding direction of the second feed line.

In a third aspect, an embodiment of the present disclosure provides a communication system, which includes the above-mentioned antenna.

In some implementations, the communication system further includes:

a transceiving unit configured to transmit or receive a signal;

a radio frequency transceiver, which is connected with the transceiving unit and configured to modulate the signal transmitted by the transceiving unit or demodulate the signal received by the transparent antenna and then transmit the signal to the transceiving unit;

a signal amplifier, which is connected with the radio frequency transceiver and is configured to improve signal-to-noise ratio of the signal output by the radio frequency transceiver or the signal received by the transparent antenna;

a power amplifier, which is connected with the radio frequency transceiver and is configured to amplify power of the signal output by the radio frequency transceiver or the signal received by the transparent antenna; and a filtering unit, which is connected with the signal amplifier and the power amplifier, is connected with the transparent antenna, and is configured to filter the received signal and then transmit the filtered signal to the transparent antenna or filter the signal received by the transparent antenna.

DRAWINGS

DETAILED DESCRIPTION

In order that those skilled in the art will better understand the technical solutions of the present disclosure, the following detailed description is given with reference to the accompanying drawings and the specific embodiments.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the words "a," "an," or "the" and similar referents do not denote a limitation of quantity, but rather denote the presence of at least one. The word "comprising" or "including", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when the absolute position of the object being described is changed, the relative positional relationships may also be changed accordingly.

Figure 1:
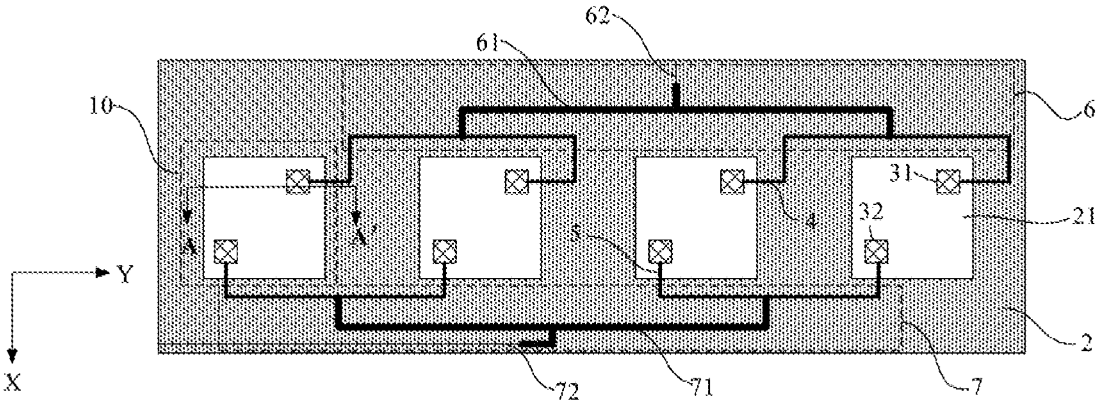
FIG. 1 is a top view of an antenna in an embodiment of the present disclosure.
Figure 2:
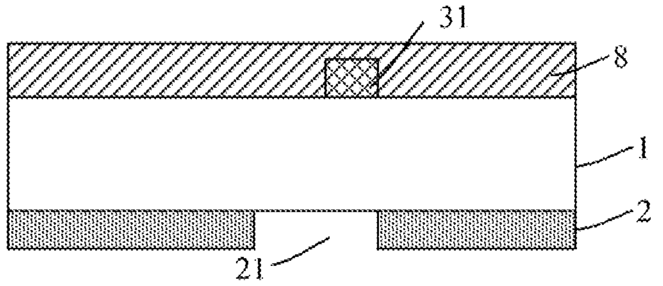
FIG. 2 is a partial cross-sectional view taken along line A-A' of FIG. 1.

In a first aspect, FIG. 1 is a top view of an antenna in an embodiment of the present disclosure; FIG. 2 is a partial cross-sectional view of the antenna taken along line A-A' of FIG. 1; as shown in FIGS. 1 and 2, an embodiment of the present disclosure provides an antenna, which includes a dielectric layer 1, a first electrode 2, at least one radiating structure, at least one first feed line 4, and at least one second feed line 5.

The first electrode 2 is disposed on the dielectric layer 1, and the first electrode 2 is provided with at least one first opening 21 therein. The radiating structure, the first feed line 4 and the second feed line 5 are all located on a side of the dielectric layer 1 different from that with the first electrode 2 thereon. Each radiating structure includes a second electrode 31 and a third electrode 32, orthographic projections of the second electrode 31 and the third electrode 32 on the dielectric layer 1 are located in an orthographic projection of one first opening 21 corresponding thereto on the dielectric layer 1, and the orthographic projections of the second electrode 31 and the third electrode 32 on the dielectric layer 1 do not overlap with each other. For example, in a case where a plurality of radiating structures are provided, a plurality of first openings 21 are provided, and the radiating structures may be disposed in correspondence with the first openings 21 one to one. It should be noted that the first electrode 2 may be a ground electrode layer, that is, a potential written into the first electrode 2 is a ground potential.

Each first feed line 4 is configured to feed power to one second electrode 31, and each second feed line 5 is configured to feed power to one third electrode 32. For example, in case where a plurality of radiating structures are provided, a plurality of second electrodes 31 and a plurality of third electrodes 32 are also provided, and correspondingly, a plurality of first feed lines 4 and a plurality of second feed lines 5 are also provided, in such case, the second electrodes 31 are arranged in correspondence with the first feed lines 4 one to one, and the third electrodes 32 are arranged in correspondence with the second feed lines 5 one to one.

In the embodiment of the present disclosure, feeding directions of the first feed line 4 and the second feed line 5 are different from each other. In some examples, the feeding direction of one of the first feed line 4 and the second feed line 5 is a vertical direction, and the feeding direction of the other of the first feed line 4 and the second feed line 5 is a horizontal direction. It should be noted that the feeding direction of the first feed line 4 is a direction in which an input terminal for a first microwave signal is excited to feed the first microwave signal into the second electrode 31; the feeding direction of the second feed line 5 is a direction in which an input terminal for a second microwave signal is excited to feed the second microwave signal into the third electrode 32; and the horizontal direction and the vertical direction are relative to each other, that is, when the feeding direction of the first feed line 4 is the vertical direction, the feeding direction of the second feed line 5 is the horizontal direction, and when the feeding direction of the first feed line 4 is the horizontal direction, the feeding direction of the second feed line 5 is the vertical direction. In the embodiment of the present disclosure, a case where the first feed line 4 is connected at a right side of the radiating structure, and the feeding direction of the first feed line 4 is the vertical direction, and the second feed line 5 is connected at a lower side of the radiating structure, and the feeding direction of the second feed line 5 is the horizontal direction is taken as an example for illustration.

In the antenna of the embodiment of the present disclosure, since each radiating structure includes two radiating elements, one of which is the second electrode 31 and the other of which is the third electrode 32. The second electrode 31 and the third electrode 32 are fed by the first feed line 4 and the second feed line 5, respectively, and the feeding directions of the first feed line 4 and the second feed line 5 are different from each other, so that the antenna of the embodiment of the present disclosure is a dual-polarized antenna.

In some examples, as shown in FIG. 2, the dielectric layer 1 in the antenna is of a single-layer structure, and a material thereof includes but is not limited to flexible materials, for example, the dielectric layer 1 is made of polyimide (PI) or polyethylene terephthalate (PET). Certainly, the dielectric layer 1 may be a glass substrate. In some examples, when the dielectric layer 1 is made of PET, the dielectric layer 1 has a thickness ranging from 100 μm to 300 μm, and a dielectric constant ranging from 3.0 to 3.5. When the dielectric layer 1 is of the single-layer structure, the second electrode 31 and the third electrode 32 may be disposed in a same layer, for example, the second electrode 31 and the third electrode 32 are arranged on an upper surface of the dielectric layer 1; correspondingly, the first electrode 2 is arranged on a lower surface of the dielectric layer 1. Further, a protective layer 8 may be further disposed on a side of the second electrode 31 and the third electrode 32 away from the dielectric layer 1, for example, the protective layer 8 may be a transparent waterproof coating with self-repairing capability.

Figure 3:
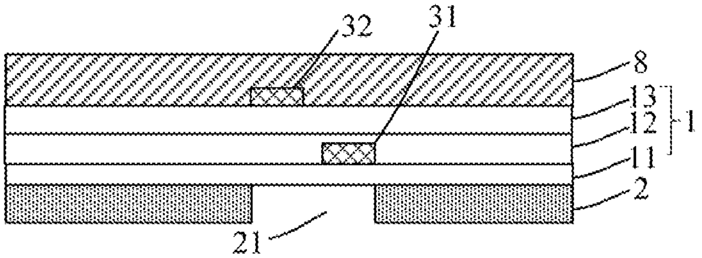
FIG. 3 is a cross-sectional view of another antenna in an embodiment of the present disclosure.

In some examples, FIG. 3 is a cross-sectional view of another antenna in an embodiment of the present disclosure; as shown in FIG. 3, the dielectric layer 1 in the antenna is a composite film layer, and includes a first dielectric sub-layer 11, a first bonding layer 12, and a second dielectric sub-layer 13, which are sequentially stacked. The first electrode 2 is arranged on a side of the first dielectric sub-layer 11 away from the first bonding layer 12, the second electrode 31 is arranged on a side of the first dielectric sub-layer 11 close to the first bonding layer 12, and the third electrode 32 is arranged on a side of the second dielectric sub-layer 13 away from the first bonding layer 12. By providing the second electrode 31 and the third electrode 32 in different layers, interference of signals between the second electrode 31 and the third electrode 32 can be reduced. Further, the protective layer 8 may be further disposed on a side of the third electrode 32 away from the second dielectric sub-layer 13, for example, the protective layer 8 may be a transparent waterproof coating with self-repairing capability. In some examples, materials of the first dielectric sub-layer 11 and the second dielectric sub-layer 13 include, but are not limited to, polyimide (PI) or polyethylene terephthalate (PET) adopted by the dielectric layer 1. A material of the first adhesive layer 12 may be transparent optical adhesive (OCA).

Figure 4:
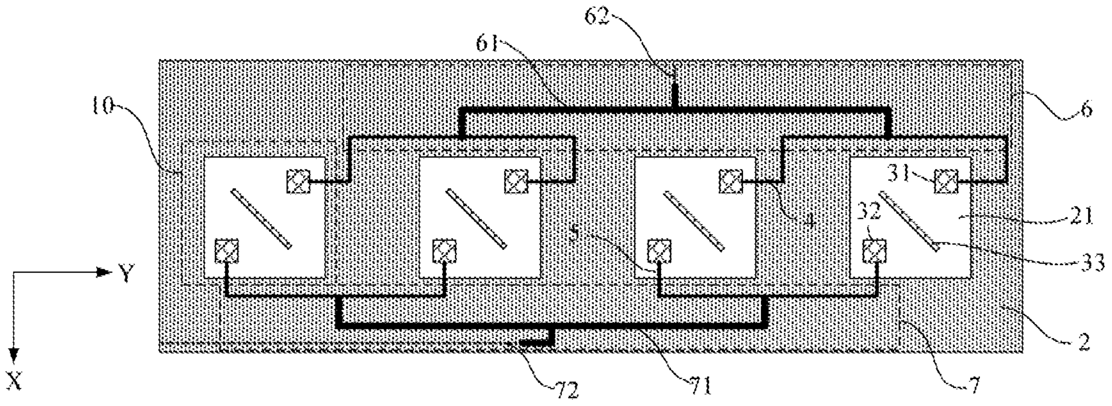
FIG. 4 is a top view of another antenna in an embodiment of the present disclosure.

FIG. 4 is a top view of another antenna in an embodiment of the present disclosure; as shown in FIG. 4, in some examples, the antenna includes not only the above-described structures, but also at least one fourth electrode 33, and an orthogonal projection of the fourth electrode 33 on the dielectric layer 1 is located within an orthogonal projection of the first opening 21, corresponding to the fourth electrode 33, on the dielectric layer 1. The fourth electrode 33 is arranged in a floating state, i.e., the fourth electrode 33 is not directly electrically connected to other structures of the antenna. For each fourth electrode 33, an extended in a longitudinal direction of the orthogonal projection thereof on the dielectric layer 1 divides the orthogonal projection of the first opening 21 on the dielectric layer 1 into a first area and a second area. Orthographic projections of the second electrode 31 and the third electrode 32 on the dielectric layer 1 are respectively located in the first area and the second area. By providing the fourth electrode 33, the second electrode 31 and the third electrode 32 are separated from each other in the first opening 21, thereby avoiding interference of signals between the second electrode 31 and the third electrode 32.

In some examples, the fourth electrode 33, the second electrode 31, and the third electrode 32 are all disposed in a same layer, that is, the fourth electrode 33, the second electrode 31, and the third electrode 32 may be made of a same conductive material and formed by a single patterning process. Therefore, the addition of the fourth electrode 33 in the antenna structure will not increase the number of process steps.

In some examples, the fourth electrode 33 may be of a metal mesh structure. In a case where the antenna of the embodiment of the present disclosure is a transparent antenna, the fourth electrode 33 adopting the metal mesh structure can effectively improve the light transmittance. In addition, in a case where the fourth electrode 33 is disposed in the same layer as the second electrode 31 and the third electrode 32, the fourth electrode 33, the second electrode 31 and the third electrode 32 may be formed through a single patterning process, so that the second electrode 31 and the third electrode 32 may be formed into the metal mesh structure. In addition, the first electrode 2 may also adopt the metal mesh structure. A material of the metal mesh structure includes but is not limited to at least one of copper (Cu), aluminum (Al), molybdenum (Mo), or silver (Ag). In some examples, shapes of hollowed-out portions of the metal mesh structure may be triangle, diamond, square, or the like. Shapes of the hollow-out portions of the metal mesh structure are not limited in the embodiment of the present disclosure. In the embodiment of the present disclosure, the hollow-out portions of the metal mesh structure are illustrated as triangles, but this does not limit the scope of the embodiment of the present disclosure. For example, when the shapes of the hollow-out portions of the metal mesh structure are triangles, a ratio of a length of a side of the triangle to a width of the side (i.e., a line width of the metal mesh structure) is not less than 0.03, for example, the length of the side of the triangle is 0.2 mm and a line width of the metal mesh structure is 10 μm, i.e., the ratio of the length of the side of the triangle to the line width of the metal mesh structure is 0.05.

In some examples, the second electrode 31 and the third electrode 32 have a same pattern. For example, an outline shape of each of the second electrode 31 and the third electrode 32 is square. The fourth electrode 33 is a strip-shaped electrode, that is, an outline of the fourth electrode 33 is rectangular. In the embodiment of the present disclosure, a ratio of a width of the fourth electrode 33 to a width of the second electrode 31 (or the third electrode 32) ranges from about 0.1 to about 0.4. For example, when widths of the first electrode 2 and the second electrode 31 are both 5 mm and a width of the fourth electrode 33 is 1 mm, the ratio of the width of the fourth electrode 33 to the width of the second electrode 31 (or the third electrode 32) is 0.2.

In some examples, edges of the metal mesh structure may be open, i.e., metal wires constituting the metal mesh structure are not connected to each other at edge locations of the metal mesh structure; certainly, the edges of the metal mesh structure may also be closed, that is, the metal wires constituting the metal mesh structure are shorted with each other at the edge locations of the metal mesh structure.

In some examples, a shape of the first opening 21 of the first electrode 2 may be any one of rectangular, triangular, circular or elliptical, but may also be other shapes. The second electrode 31 and the third electrode 32 may have a same shape or different shapes, and in the embodiment of the present disclosure, a case where the second electrode 31 and the third electrode 32 have the same shape, which may be any one of a rectangle, a triangle, a circle, or an ellipse, and may also be of other shapes, is taken as example for illustration. As shown in FIG. 4, in the embodiment of the present disclosure, the first opening 21 in the first electrode 2, the second electrode 31 and the third electrode 32 are all rectangular, which is not intended to limit the scope of the embodiment of the present disclosure.

Figure 5:
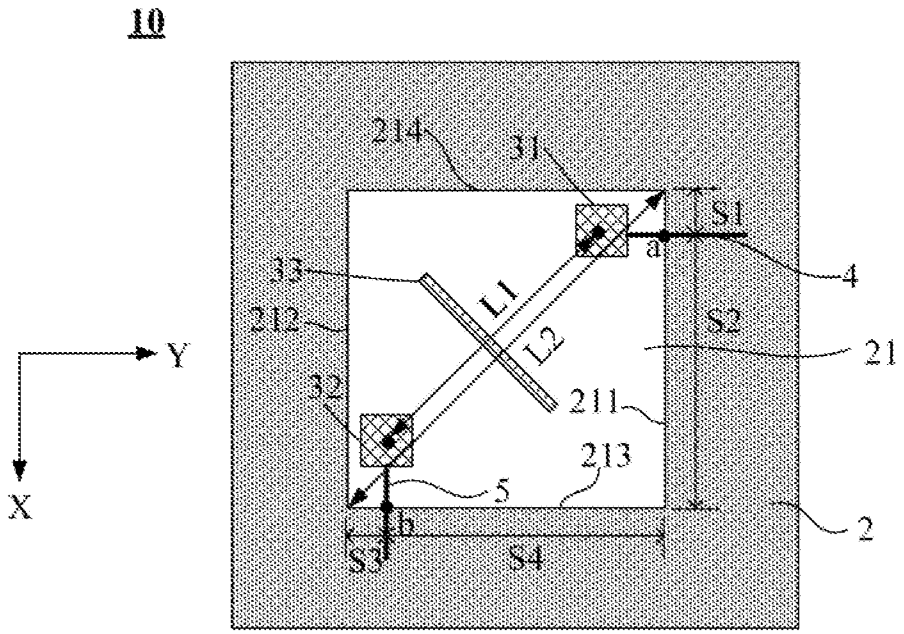
FIG. 5 is a schematic diagram of a radiating element in an embodiment of the present disclosure.

FIG. 5 is a schematic diagram of a radiating element 10 in an embodiment of the present disclosure; the radiating structure includes at least one radiating element 10. As shown in FIG. 5, one first opening 21 in the first electrode 2, the second electrode 31 and the third electrode 32, the orthographic projections of which on the dielectric layer 1 are located within the orthographic projection of the first opening 21 on the dielectric layer 1, the first feed line 4 connected to the second electrode 31, and the second feed line 5 connected to the third electrode 32 form the radiating element 10. In short, the radiating element 10 includes one first opening 21, one second electrode 31, one third electrode 32, one first feed line 4, and one second feed line 5. In some examples, for the radiating element 10, a line connecting a center of the second electrode 31 and a center of the third electrode 32 is parallel to one of diagonal lines of the first opening 21. For example, the line connecting the center of the second electrode 31 and the center of the third electrode 32 overlaps with an orthographic projection of the one of the diagonal lines of the first opening 21 on the dielectric layer 1. In this way, positions of the second electrode 31 and the third electrode 32 in the radiating element 10 may be set properly to improve the radiation efficiency of the antenna.

Further, for each radiating element 10, a length of the line connecting the center of the second electrode 31 and the center of the third electrode 32 is L1, and the length of the one of the diagonal lines of the first opening 21 is L2; a ratio of L1 to L2 ranges from 0.2 to 0.6. For example, L1:L2=0.488. By properly setting a distance between the second electrode 31 and the third electrode 32, the radiation efficiency of the antenna is improved while the isolation between the second electrode 31 and the third electrode 32 is ensured.

Further, the first opening 21 includes a first side 211 and a second side 212 which are oppositely arranged, and a third side 213 and a fourth side 214 which are oppositely arranged. The first side 211, the second side 212, the third side 213 and the fourth side 214 of the first opening 21 each include a first endpoint and a second endpoint that are oppositely arranged. The first and second endpoints of each of the first and second sides 211 and 212 refer to an upper endpoint and a lower endpoint shown in FIG. 5, respectively; the first and second endpoints of each of the third and fourth sides 213 and 214 refer to a left endpoint and a right endpoint shown in FIG. 5, respectively. For any radiating element 10, an orthographic projection of the first side 211 of the first opening 21 on the dielectric layer 1 intersects with an orthographic projection of the first feed line 4 on the dielectric layer 1 at a first intersection point a; an orthographic projection of the third side of the first opening 21 on the dielectric layer 1 intersects with an orthographic projection of the second feed line 5 on the dielectric layer 1 at a second intersection point b; a ratio of a distance S1 between an orthographic projection of the first endpoint of the first side of the first opening 21 on the dielectric layer 1 and the first intersection point a to a distance S2 between an orthographic projection of the second endpoint of the first side of the first opening 21 on the dielectric layer 1 and the first intersection point a ranges from 0.1 to 1.1; a ratio of a distance S3 between an orthographic projection of the first endpoint of the third side of the first opening 21 on the dielectric layer 1 and the second intersection point b to a distance S4 between an orthographic projection of the second endpoint of the third side of the first opening 21 on the dielectric layer 1 and the second intersection point b ranges from 0.1 to 1.1.

In some examples, with continued reference to FIG. 4, the antenna of embodiment of the present disclosure includes not only the above-described structures, but also a first feeding structure 6 and a second feeding structure 7. An orthographic projection of the first feeding structure 6 on the dielectric layer 1 at least partially overlaps the orthographic projection of the first feed line 4 on the dielectric layer 1, and the first feeding structure 6 is configured to feed power to the second electrode 31 through the first feed line 4. An orthographic projection of the second feeding structure 7 on the dielectric layer 1 at least partially overlaps the orthographic projection of the second feed line 5 on the dielectric layer 1, and the second feeding structure 7 is configured to feed power to the third electrode 32 through the second feed line 5. In an example, the first feed line 4 and the second electrode 31 are disposed in a same layer, while the first feed line 4 and the first feed structure 6 are disposed in a same layer and are electrically connected with each other directly; correspondingly, the second feed line (microstrip line) 5 and the third electrode 32 are disposed in a same layer, while the second feed line 5 and the second feeding structure 7 are disposed in a same layer and electrically connected to each other directly. In another example, the first feed line 4 and the first feeding structure 6 are disposed in different layers, and the first feeding structure 6 feeds power to the first feed line 4 by coupling; correspondingly, the second feed line 5 and the second feeding structure 7 are disposed in different layers, and the second feeding structure 7 feeds power to the second feed line 5 by coupling.

Further, in some examples, when the number of the first openings 21 in the first electrode 2 is $2^n$, the number of the radiating structures is also $2^n$, and meanwhile, the first feeding structure 6 includes n stages of third feed lines 61, and the second feeding structure 7 includes n stages of fourth feed lines 71. The third feed line 61 at a first stage is connected to two adjacent first feed lines 4, and the first feed lines 4 connected to different third feed lines 61 at the first stage are different from each other; the third feed line 61 at an $m^{th}$ stage is connected to two adjacent third feed lines 61 at an $(m-1)^{th}$ stage, and different third feed lines 61 at the $(m-1)^{th}$ stage are connected to different third feed lines 61 at the $m^{th}$ stage. The fourth feed line 71 at the first stage is connected to two adjacent second feed lines 5, and the second feed lines 5 connected to different fourth feed lines 71 at the first stage are different from each other; the fourth feed line 71 at the $m^{th}$ stage are connected to two adjacent fourth feed lines 71 at the $(m-1)^{th}$ stage, and different fourth feed lines 71 at the $(m-1)^{th}$ stage are connected to different fourth feed lines 71 at the $m^{th}$ stage; where n is greater than or equal to 2, m is greater than or equal to 2 and less than or equal to n, and both m and n are integers.

Taking the antenna shown in FIG. 4 as an example, the antenna includes four radiating structures, where n is 2, i.e., the first feeding structure 6 includes two stages and three third feed lines 61, and the second feeding structure 7 includes two stages and three fourth feed lines 71. One of the third feed lines 61 at the first stage is connected with feeding ends of the first and second first feed lines 4 in a left-to-right direction, and another of the third feed lines 61 at the first stage is connected with feeding ends of the third and forth first feed lines 4 in the left-to-right direction; the third feed line 61 at the second stage is connected to feeding ends of the two third feed lines 61 at the first stage. Similarly, one of the fourth feed lines 71 at the first stage is connected with feeding ends of the first and second feed lines 5 in the left-to-right direction, and another of the fourth feed lines 71 at the first stage is connected with feeding ends of the third and forth second feed lines 5 in the left-to-right direction; the fourth feed line 71 at the second stage is connected with feeding ends of the two fourth feed lines 71 at the first stage. In such case, the feeding end of the third feed line 61 at the second stage in the first feeding structure 6 (i.e., the feeding end 62 of the first feeding structure 6) corresponds to horizontal polarization, and the feeding end of the fourth feed line 71 at the second stage in the second feeding structure 7 (i.e., the feeding end 72 of the second feeding structure 7) corresponds to vertical polarization.

In some examples, the first feed line 4 and the second feed line 5 have the same or substantially the same width; the third feed line 61 and the fourth feed line 71 have the same or substantially the same width. It should be noted that, “substantially the same” in the embodiment of the present disclosure means that a difference between widths of the two feed lines is within a preset range, for example, if the difference between the widths of the first and second feed lines 4 and 5 is not more than 0.1 mm, then the widths of the first and second feed lines 4 and 5 are considered to be substantially the same. Further, a ratio of the width of the first feed line 4 (or the second feed line 5) to the width of the third feed line 61 (or the fourth feed line 71) ranges from 0.2 to 0.5; for example, the widths of the first feed line 4 and the second feed line 5 each are about 0.6 mm; the widths of the third feed line 61 and the fourth feed line 71 each are 1.5 mm; the ratio of the width of the first feed line 4 to the width of the third feed line 61 is 0.6:1.5=0.4. Generally, the first feed line 4, the second feed line 5, the third feed line 61 and the fourth feed line 71 are arranged in a same layer and made of a same material, and the ratio of the width of the first feed line 4 to the width of the third feed line 61 is properly set to realize impedance matching. In some examples, the first feed line 4, the second feed line 5, the third feed line 61 and the fourth feed line 71 may each adopt a metal mesh structure. When the first feed line 4, the second feed line 5, the third feed line 61, the fourth feed line 71, the first electrode 2, the second electrode 31, the third electrode 32 and the fourth electrode 33 each adopt the metal mesh structure, orthographic projections of hollow-out portions of one metal mesh structure on the dielectric layer 1 are completely overlapped or substantially overlapped with orthographic projections of hollow-out portions of another metal mesh structure on the dielectric layer 1. It should be noted that, the substantially overlapped in the embodiment of the present disclosure means that a width of non-overlapped area between the orthogonal projection of the hollow-out portion of one metal mesh structure and the orthogonal projection of the hollow-out portion of another metal mesh structure is not greater than the line width of the metal mesh structure. By such setting, the optical transmittance of the antenna can be effectly improved.

Figure 6:
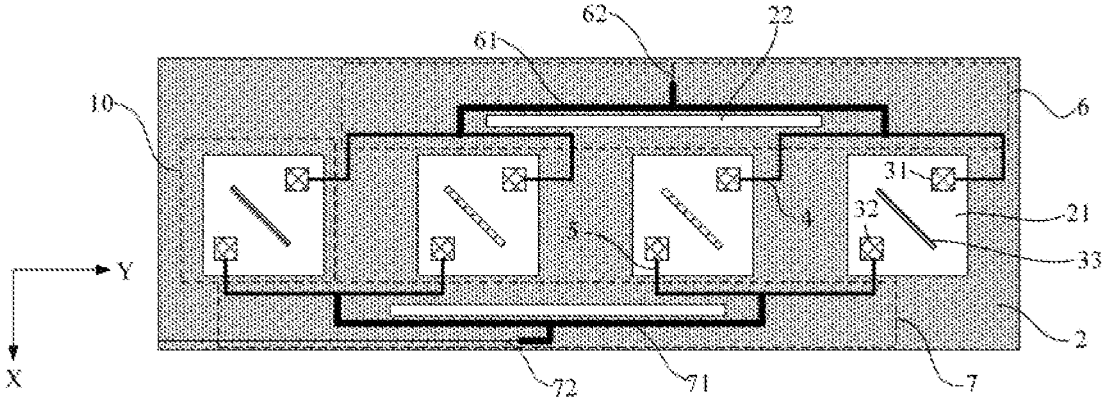
FIG. 6 is a top view of another antenna in an embodiment of the present disclosure.

In some examples, FIG. 6 shows a top view of another antenna in an embodiment of the present disclosure; as shown in FIG. 6, the antenna has a radiation region where the radiating elements 10 are disposed and a feeding region where the first feeding structure 6 and the second feeding structure 7 are disposed. The structure of the antenna shown in FIG. 6 is substantially the same as that of the antenna shown in FIG. 4, except the difference in the structure of the first electrode 2. The first electrode 2 shown in FIG. 6 includes not only the first openings 21 located in the radiation region but also second openings 22 located in the feeding region, and orthographic projections of the second openings 22 on the dielectric layer 1 are not overlapped with the orthographic projections of the first feeding structure 6 and the second feeding structure 7 on the dielectric layer 1. By providing the second openings 22, not only the optical transmittance of the antenna can be improved, but also the radiation direction of the microwave signal can be changed.

Figure 7:
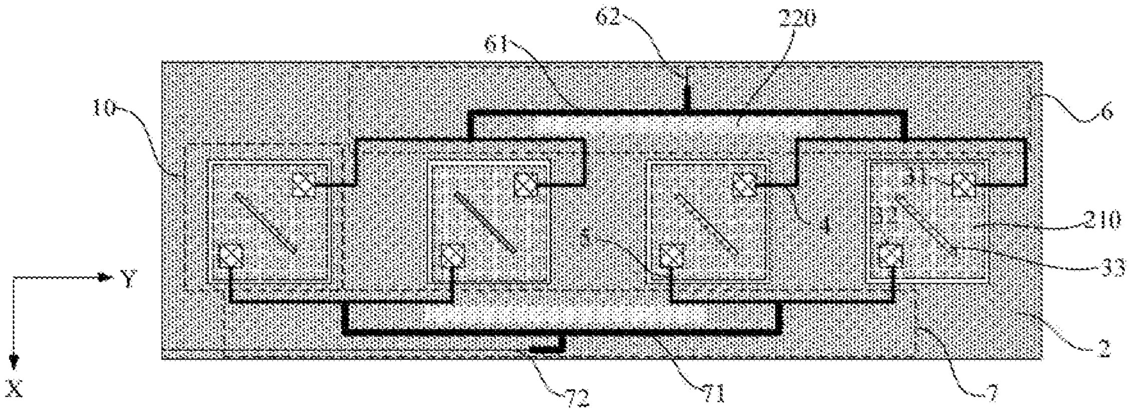
FIG. 7 is a top view of another antenna in an embodiment of the present disclosure.

In some examples, FIG. 7 is a top view of another antenna in an embodiment of the present disclosure; as shown in FIG. 7, the antenna has substantially the same structure as that shown in FIG. 6, except that each first opening 21 of the first electrode is filled with a first redundant electrode 210, and each second opening 22 is filled with a second redundant electrode 220. In some examples, the first redundant electrode 210 and the second redundant electrode 220 are both disposed in the same layer and are made of the same material as the first electrode 2. That is, the first redundant electrode 210, the second redundant electrode 220 and the first electrode 2 may be manufactured by a single patterning process. It should be noted that, the first redundant electrode 210 and the second redundant electrode 220 each may also adopt a metal mesh structure, but metal wires of the metal mesh structure constituting each of the first redundant electrode 210 and the second redundant electrode 220 are broken, for example, after the metal mesh structure are formed, the metal wires of the metal mesh structure of each of the first redundant electrode 210 and the second redundant electrode 220 are cut up by a laser method.

Figure 8:
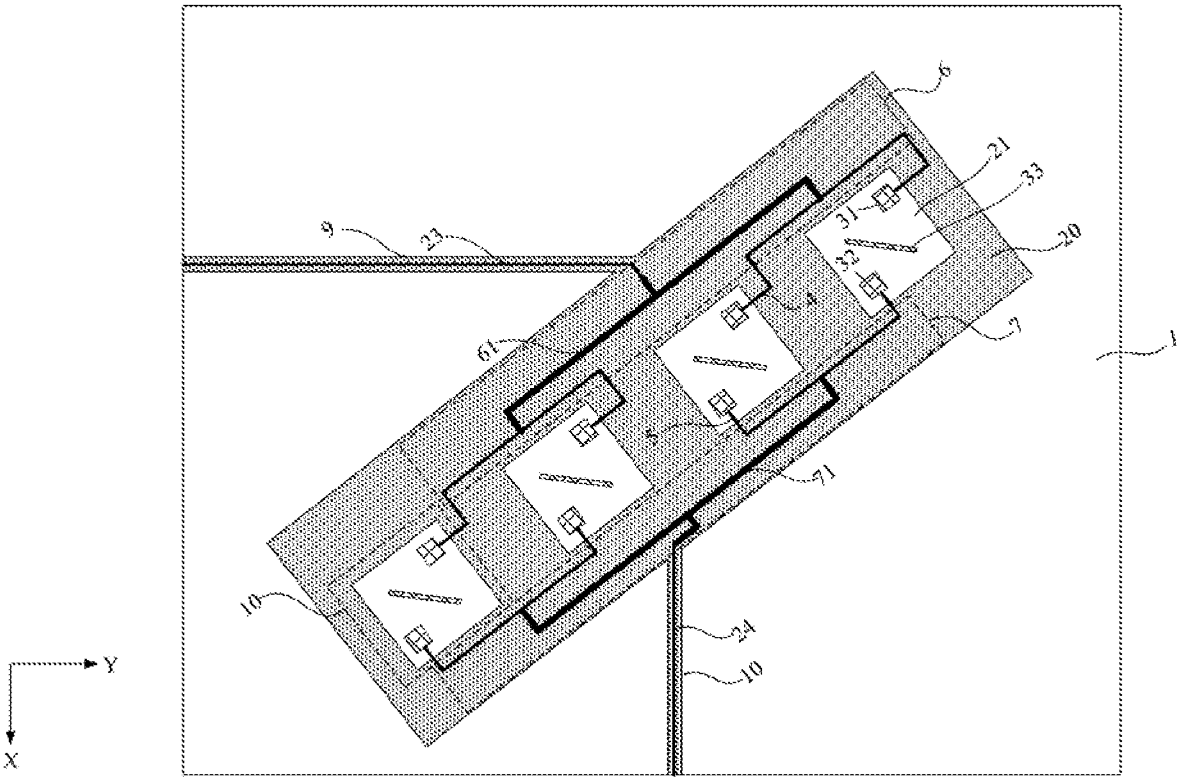
FIG. 8 is a top view of another antenna in an embodiment of the present disclosure.

In some examples, FIG. 8 is a top view of another antenna in an embodiment of the present disclosure; as shown in FIG. 8, the structure of the antenna is substantially the same as that shown in FIG. 4, except that each radiating element 10 of the antenna is rotated by 45° as a whole compared with the radiating element 10 of the antenna in FIG. 4. Specifically, the first electrode 2 of the antenna shown in FIG. 8 includes a main body portion 20, a first branch 23 and a second branch 24, where the first branch 23 and the second branch 24 are respectively connected to two sides of the main body portion 20 in a length direction of the main body portion 20, and the antenna further includes a fifth feed line 9 connected to the feeding end 62 of the first feeding structure 6, and a sixth feed line 10 connected to the feeding end 72 of the second feeding structure 7; an orthographic projection of the fifth feed line 9 on the dielectric layer 1 is located in an orthographic projection of the first branch 23 on the dielectric layer 1; an orthographic projection of the sixth feed line 10 on the dielectric layer 1 is located in an orthographic projection of the second branch 24 on the dielectric layer 1; a perpendicular bisector of the width of the main body portion 20 coincides with one of diagonal lines of the dielectric layer 1; an extending direction of the fifth feed line 9 (i.e., a direction in which the fifth feed line 9 extends) and an extending direction of the sixth feed line 10

(i.e., a direction in which the sixth feed line 10 extends) are perpendicular to each other, and an included angle between the fifth feed line and the diagonal line of the dielectric layer 1 and an included angle between the sixth feed line and the diagonal line of the dielectric layer 1 each are 45°. Taking the case shown in FIG. 8 as an example, a feeding end of the fifth feed line 9 corresponds to +45° polarization, and a feeding end of the sixth feed line 10 corresponds to −45° polarization. That is, the antenna shown in FIG. 8 can realize ±45° polarization.

In some examples, the first electrode 2, the second electrode 31, the third electrode 32, the fourth electrode 33, the first feed line 4, the second feed line 5, the third feed line 61, the fourth feed line 71, the fifth feed line 9, and the sixth feed line 10 may each adopt a metal mesh structure, and an edge of the metal mesh structure of at least one of the second electrode 31, the third electrode 32, the fourth electrode 33, the first feed line 4, the second feed line 5, the third feed line 61, the fourth feed line 71, the fifth feed line 9, or the sixth feed line 10 intersects with an orthographic projection of the metal mesh structure of the first electrode 2 on the dielectric layer 1.

In order to make the structure and performance of the antenna of the embodiment of the present disclosure clearer, the antenna of the embodiment of the present disclosure is described below with reference to specific examples and simulation results.

In a first example, the antenna is a horizontally and vertically (0°/90°) polarized antenna, the top view of the antenna is shown in FIG. 4, and the cross-sectional view of the antenna is shown in FIG. 2. An overall size of the antenna is 77.465 mm*200 mm, the dielectric layer 1 has a thickness of 250 μm and made of the PET material, Dk/Df of the dielectric layer 1 is 3.34/0.0069. The first electrode 2 is of a metal planar structure with a thickness of 2.0 μm and made of copper, and the first opening 21 in the first electrode 2 is a rectangular groove. The second electrode 31 and the third electrode 32 are arranged in a same layer, and each are of a metal planar structure with a thickness of 2.0 μm and made of copper, and the second electrode 31 and the third electrode 32 are both rectangular; a fourth electrode 33 located in the same layer as the second electrode 31 and the third electrode 32 is disposed in each radiating element 10, and the fourth electrode 33 is also of a metal planar structure having a thickness of 2.0 μm and made of copper. The −6 dB impedance bandwidths of the feeding end 62 of the first feeding structure 6 and the feeding end 72 of the second feeding structure 7 of the antenna obtained by simulation with the above structural are 1.13 GHz (from 3.37 GHz to 4.5 GHz) and 1.27 GHz (from 3.23 GHz to 4.5 GHz), respectively, and at the central frequency point (3.75 GHz), the two feeding ends (i.e., the feeding end 62 and the feeding end 72) have gains of 9.09 dBi and 7.50 dBi, respectively, half-power beam widths of 21°/64° and 74°/19°, respectively, and polarization isolations of 21.05 dB and 11.09 dB, respectively.

In a second example, the antenna is a horizontally and vertically (±45°) polarized antenna, the top view of the antenna is shown in FIG. 8, and the cross-sectional view of the antenna is shown in FIG. 2. An overall size of the antenna is 188.4 mm*188.4 mm, the dielectric layer 1 has a thickness of 250 μm and made of the PET material, Dk/Df of the dielectric layer 1 is 3.34/0.0069; the first electrode 2 is of a metal mesh structure with a thickness of 2.0 μm and made of copper, and each first opening 21 in the first electrode 2 is a rectangular groove. The second electrode 31 and the third electrode 32 are arranged in a same layer, and each are of a metal mesh structure with a thickness of 2.0 μm and made of copper, and the second electrode 31 and the third electrode 32 are both rectangular; a fourth electrode 33 located in the same layer as the second electrode 31 and the third electrode 32 is disposed in each radiating element 10, and the fourth electrode 33 is also of a metal mesh structure with a thickness of 2.0 μm and made of copper. The hollow-out portions in each metal mesh structure each are triangular, the line width of the metal mesh structure is 10 μm, a length of a side of the triangle is 200 μm, and the transmittance of the antenna is 70%. The actual measured values of −6 dB impedance bandwidths of the feeding end 62 of the first feeding structure 6 and the feeding end 72 of the second feeding structure 7 of the antenna obtained through simulation with the above mentioned structure each are 0.9 GHz (from 3.3 GHz to 4.2 GHz), entire frequency bands of n77 and n78 are covered, the actual measured values of the maximum gains of the two feeding ends (i.e., the feeding end 62 and the feeding end 72) in the range from 3 GHz to 5 GHz are respectively 7.89 dBi@4.68 GHz and 6.03 dBi@4.44 GHz, and correspondingly, radiation efficiencies being 67.4% and 52.5% respectively are resulted in.

In a third example, a structure of the antenna is substantially the same as that of the antenna of FIG. 8, except that the first electrode 2, the second electrode 31, the third electrode 32, and the fourth electrode 33 each are of a planar structure, but not the metal mesh structure. An overall size of the antenna is still 188.4 mm*188.4 mm. The −6 dB impedance bandwidths of the feeding end 62 of the first feeding structure 6 and the feeding end 72 of the second feed structure 7 of the antenna are respectively 1.11 GHz (from 3.39 GHz to 4.5 GHz) and 1.25 GHz (from 3.25 GHz to 4.5 GHz), and at a central frequency point (3.75 GHz), the feeding ends 62 and 72 respectively have gains of 9.32 dBi and 6.91 dBi, half-power beam widths of 47°/20° and 72°/18°, and the polarization isolations of 20.12 dB and 10.65 dB, respectively. The feeding ends 62 and 72 respectively have the maximum gains respectively being 10.20 dBi@4.64 GHz and 8.39 dBi@5 GHz within a range from 3 GHz to 5 GHz, and correspondingly, the radiation efficiencies of the antenna are 72.9% and 64.8%, respectively.

In a fourth example, a top view of the antenna is shown in FIG. 8 and a cross-sectional view of the antenna is shown in FIG. 3. The dielectric layer 1 of the antenna adopts a composite film layer which includes a first dielectric sub-layer 11, a first bonding layer 12 and a second dielectric sub-layer 13 which are sequentially stacked. The first electrode 2 is arranged on a side of the first dielectric sub-layer 11 away from the first bonding layer 12, the second electrode 31 is arranged on a side of the first dielectric sub-layer 11 close to the first bonding layer 12, and the third electrode 32 is arranged on a side of the second dielectric sub-layer 13 away from the first bonding layer 12. No isolation strip is provided in this antenna. The remaining structures of the antenna are the same as those in the third example, and therefore, the description thereof is omitted. An overall size of the antenna is 189.4 mm*189.4 mm, the −6 dB impedance bandwidths of the feeding end 62 of the first feeding structure 6 and the feeding end 72 of the second feeding structure 7 of the antenna obtained by simulation with the above structure are respectively 1.25 GHz (from 3.25 GHz to 4.5 GHz) and 1.25 GHz (from 3.25 GHz to 4.5 GHz), and at a central frequency point (3.75 GHz), the feeding end 62 and the feeding end 72 respectively have gains of 9.06 dBi and 7.32 dBi, half-power beam widths of 48°/20° and 72°/18°, and the polarization isolations of 21.32 dB and 11.74 dB.

In a fifth example, a top view of the antenna is shown in FIG. 1, a cross-section of the antenna is shown in FIG. 2. Compared with the third example, the isolation strip is removed from the antenna and both polarizations are still formed on the same dielectric layer 1. The remaining structures of the antenna are the same as those in the third example, and therefore, the description thereof is omitted. An overall size of the antenna is 188.4 mm*188.4 mm. The −6 dB impedance bandwidths of the feeding end 62 of the first feeding structure 6 and the feeding end 72 of the second feeding structure 7 of the antenna obtained by simulation with the above structure are 1.11 GHz (from 3.39 GHz to 4.5 GHz) and 1.26 GHz (from 3.24 GHz to 4.5 GHz), respectively, and at the center frequency point (3.75 GHz), the feeding end 62 and the feeding end 72 respectively have gains of 9.19 dBi and 6.72 dBi, half-power beam widths of 47°/20° and 72°/18°, and polarization isolations of 17.67 dB and 9.32 dB.

Figure 9:
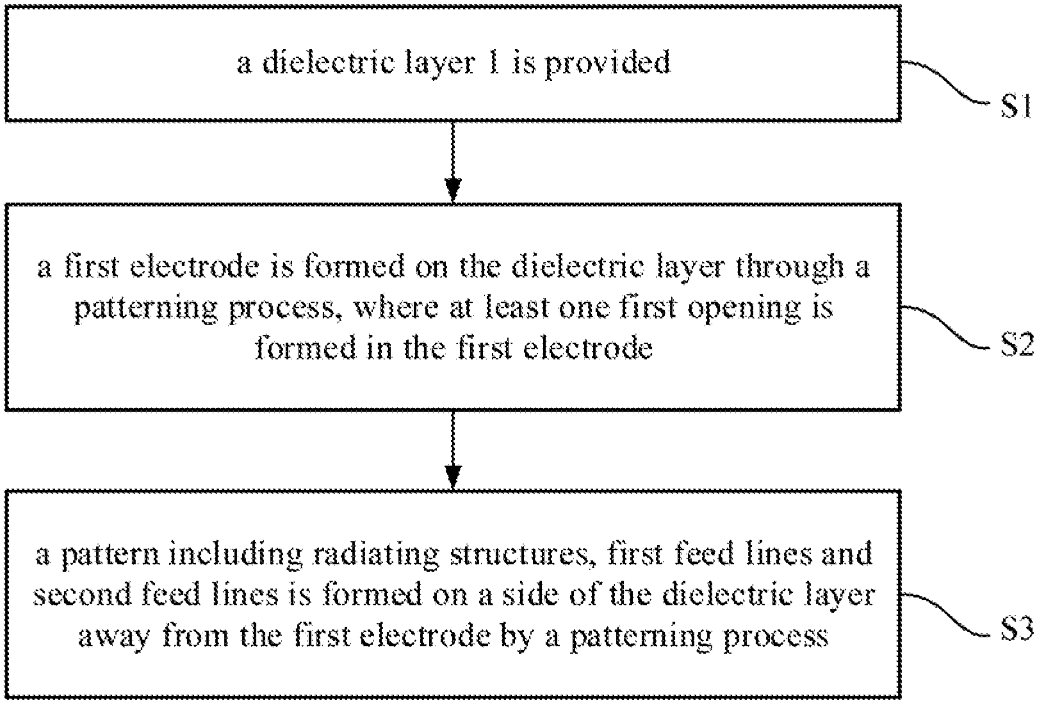
FIG. 9 is a flowchart of a method for manufacturing an antenna in an embodiment of the present disclosure.

In a second aspect, FIG. 9 is a flowchart of a method for manufacturing an antenna according to an embodiment of the present disclosure; as shown in FIG. 9, an embodiment of the present disclosure provides a method for manufacturing an antenna, which may be used to manufacture any one of the antennas described above. The method specifically includes the following steps S1 to S3.

At the step S1, a dielectric layer 1 is provided.

The dielectric layer 1 may be a flexible substrate or a glass substrate, and the step S1 may include a step of cleaning the dielectric layer 1.

At the step S2, a first electrode 2 is formed on the dielectric layer 1 through a patterning process, where at least one first opening 21 is formed in the first electrode 2.

In some examples, the step S2 may specifically include: depositing a first metal film on the dielectric layer 1 by a method including but not limited to a magnetron sputtering, then coating a photoresist, exposing and developing, then carrying out wet etching, and stripping the photoresist off after the etching, so that a pattern including the first electrode 2 is formed.

At the step S3, a pattern including radiating structures, first feed lines 4 and second feed lines 5 is formed on a side of the dielectric layer 1 away from the first electrode 2 by a patterning process, where an orthographic projection of each radiating structure on the dielectric layer 1 is located within an orthographic projection of the first opening 21 corresponding the radiating structure on the dielectric layer 1.

Each radiating structure includes a second electrode 31 and a third electrode 32, orthographic projections of the second electrode 31 and the third electrode 32 on the dielectric layer 1 are located in an orthographic projection of the first opening 21 corresponding thereto on the dielectric layer 1, and the orthographic projections of the second electrode 31 and the third electrode 32 on the dielectric layer 1 are not overlapped with each other; the first feed lines 4 are configured to feed power to the second electrodes 31 correspondingly one to one, the second feed lines 5 are configured to feed power to the third electrodes correspondingly one to one, and a feeding direction of the first feed line 4 is different from a feeding direction of the second feed line 5.

Certainly, in some examples, the first feed lines 4 and the second electrodes 31 are manufactured through a single patterning process, the second feed lines 5 and the third electrodes 32 are manufactured through a single patterning process, but the second electrodes 31 are manufactured through two patterning processes.

For example, the dielectric layer 1 includes a first dielectric sub-layer 11, a first bonding layer 12 and a second dielectric sub-layer 13 which are sequentially stacked. The first electrode 2 is formed on a side of the first dielectric sub-layer 11 away from the first bonding layer 12, the second electrode 31 is formed on a side of the first dielectric sub-layer 11 close to the first bonding layer 12, and the third electrode 32 is formed on a side of the second dielectric sub-layer 13 away from the first bonding layer 12. Further, a protective layer 8 may be formed on a side of the third electrode 32 away from the second dielectric sub-layer 13, for example, the protective layer 8 may be a transparent waterproof coating with self-repairing capability. In some examples, materials of the first dielectric sub-layer 11 and the second dielectric sub-layer 13 include, but are not limited to, polyimide (PI) or polyethylene terephthalate (PET). A material of the first bonding layer 12 may be transparent optical adhesive (OCA).

In a third aspect, an embodiment of the present disclosure provides a communication system that may include the antenna as described above, where the antenna may be fixed to an inner side of a glass window.

The glass window in the embodiment of the present disclosure may be used in glass window systems for automobiles, trains (including high-speed trains), aircraft, buildings, or the like. The antenna may be fixed to the inner side of the glass window (the side closer to the room). Since the optical transmittance of the antenna is high, the antenna has little influence on the transmittance of the glass window while realizing the communication function, and the antenna also tends to be a beautified antenna. The glass window in the embodiment of the present disclosure includes, but is not limited to, double glass, and the type of the glass window may also be single glass, laminated glass, thin glass, thick glass, or the like.

Figure 10:
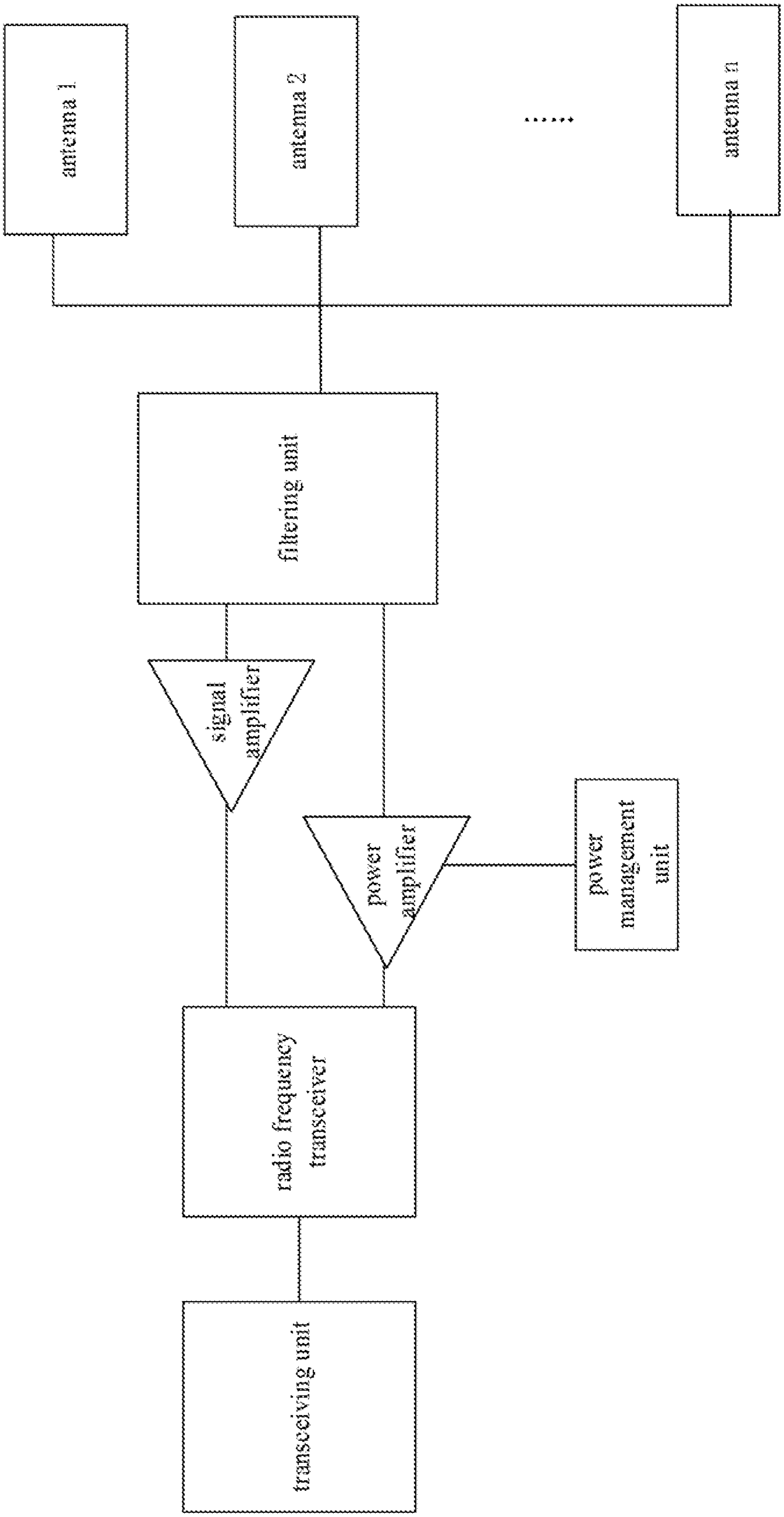
FIG. 10 is a schematic diagram of a communication system in an embodiment of the present disclosure.

In some examples, FIG. 10 is a schematic diagram of a communication system in an embodiment of the present disclosure; as shown in FIG. 10, the communication system provided in the embodiment of the present disclosure further includes a transceiver unit, a radio frequency transceiver, a signal amplifier, a power amplifier, and a filtering unit. The antenna in the communication system may be used as a transmitting antenna or as a receiving antenna. The transceiver unit may include a baseband and a receiving terminal, where the baseband provides a signal of at least one frequency band, for example, provides a 2G signal, a 3G signal, a 4G signal, a 5G signal or the like, and transmits the signal of the at least one frequency band to the radio frequency transceiver. After receiving the signal, the antenna in the communication system may transmit the signal to the receiving terminal in the transceiver unit after processing the signal by the filtering unit, the power amplifier, the signal amplifier, and the radio frequency transceiver, where the receiving terminal may be, for example, an intelligent gateway.

Furthermore, the radio frequency transceiver is connected with the transceiver unit and is used for modulating the signal transmitted by the transceiver unit or demodulating the signal received by the transparent antenna and then transmitting the signal to the transceiver unit. Specifically, the radio frequency transceiver may include a transmitting circuit, a receiving circuit, a modulating circuit, and a demodulating circuit, where after the transmitting circuit receives multiple types of signals provided by the baseband, the modulating circuit may modulate the multiple types of signals provided by the baseband and then transmit the signals to the antenna. The transparent antenna receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Furthermore, the radio frequency transceiver is connected with the signal amplifier and the power amplifier, the signal amplifier and the power amplifier are further connected with the filtering unit, and the filtering unit is connected with at least one antenna. In the process of transmitting a signal by the communication system, the signal amplifier is used for improving signal-to-noise ratio of the signal output by the radio frequency transceiver and then transmitting the signal to the filtering unit; the power amplifier is used for amplifying the power of the signal output by the radio frequency transceiver and then transmitting the signal to the filtering unit; the filtering unit specifically includes a duplexer and a filtering circuit, the filtering unit combines signals output by the signal amplifier and the power amplifier and filters noise waves and then transmits the signal to the transparent antenna, and the antenna radiates the signal. In the process of receiving a signal by the communication system, after receiving the signal, the antenna transmits the signal to the filtering unit, the filtering unit filters noise waves from the signal received by the antenna and then transmits the signal to the signal amplifier and the power amplifier, the signal amplifier adjusts the gain the signal received by the antenna to increase the signal-to-noise ratio of the signal; the power amplifier amplifies the power of the signal received by the antenna. The signal received by the antenna 1 is processed by the power amplifier and the signal amplifier and then transmitted to the radio frequency transceiver, and the radio frequency transceiver transmits the signal to the transceiver unit.

In some examples, the signal amplifier may include multiple types of signal amplifiers, such as a low noise amplifier, which is not limited herein.

In some examples, the communication system provided by the embodiment of the present disclosure further includes a power management unit, which is connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to those skilled in the art that various modifications and improvements may be made without departing from the spirit and scope of the disclosure, and such modifications and improvements are also considered to be within the scope of the disclosure.

What is claimed is:

1. An antenna, comprising:

a dielectric layer;

a first electrode arranged on the dielectric layer and provided with at least one first opening;

at least one radiating structure arranged on the dielectric layer and located on a side of the dielectric layer different from that with the first electrode thereon; each radiating structure comprises a second electrode and a third electrode, wherein orthographic projections of the second electrode and the third electrode on the dielectric layer are located in an orthographic projection of the first opening on the dielectric layer, and the orthographic projection of the second electrode on the dielectric layer is not overlapped with the orthographic projection of the third electrode on the dielectric layer;

at least one first feed line and at least one second feed line which are arranged on the dielectric layer and are located on a side of the dielectric layer different from that with the first electrode thereon; the first feed line is configured to feed power to the second electrode, the second feed line is configured to feed power to the third electrode, and a feeding direction of the first feed line is different from a feeding direction of the second feed line.

2. The antenna of claim 1, wherein at least one of the first electrode, the second electrode, and the third electrode comprises a metal mesh structure.

3. The antenna of claim 1, further comprising:

a fourth electrode arranged in a floating state and arranged on a side of the dielectric layer away from the first electrode;

an orthographic projection of each fourth electrode on the dielectric layer is located in the orthographic projection of the first opening corresponding thereto on the dielectric layer, and an extension in a length direction of the orthographic projection of the fourth electrode on the dielectric layer divides the orthographic projection of the first opening on the dielectric layer into a first area and a second area; orthographic projections of the first electrode and the second electrode on the dielectric layer are respectively located in the first area and the second area.

4. The antenna of claim 3, wherein the second electrode, the third electrode and the fourth electrode are located in a same layer.

5. The antenna of claim 3, wherein the fourth electrode comprises a metal mesh structure.

6. The antenna of claim 1, wherein the second electrode and the third electrode, with the orthogonal projections thereof on the dielectric layer being located in the orthogonal projection of the first opening on the dielectric layer, the first opening, and the first feed line connected to the second electrode and the second feed line connected to the third electrode constitute a radiating element; the radiating structure comprises at least one radiating element;

the first opening is rectangular, and for each radiating element, a line connecting a center of the second electrode and a center of the third electrode is parallel to one of diagonal lines of the first opening.

7. The antenna of claim 6, wherein for each radiating element, a ratio of a length of the line connecting the center of the second electrode and the center of the third electrode to a length of the one of the diagonal lines of the first opening ranges from 0.2 to 0.6.

8. The antenna of claim 6, wherein the first opening comprises a first side and a second side which are opposite to each other, and a third side and a fourth side which are opposite to each other; the first side, the second side, the third side and the fourth side of the first opening each comprise a first endpoint and a second endpoint which are opposite to each other;

for each radiating element, an orthographic projection of the first side of the first opening on the dielectric layer intersects with the orthographic projection of the first feed line on the dielectric layer at a first intersection point; an orthographic projection of the third side of the first opening on the dielectric layer intersects with the orthographic projection of the second feed line on the dielectric layer at a second intersection point;

a ratio of a distance between an orthographic projection of the first endpoint of the first side of the first opening on the dielectric layer and the first intersection point to a distance between an orthographic projection of the second endpoint of the first side of the first opening on the dielectric layer and the first intersection point ranges from 0.1 to 1.1;

a ratio of a distance between an orthographic projection of the first endpoint of the third side of the first opening on the dielectric layer and the second intersection point to a distance between an orthographic projection of the second end point of the third side of the first opening on the dielectric layer to the second intersection point ranges from 0.1 to 1.1.

9. The antenna of claim 6, wherein the second electrode and the third electrode each are rectangular, the second electrode and the third electrode each comprise a first side, a second side, a third side, and a fourth side, and the first side, the second side, the third side and the fourth side of each of the second electrode and the third electrode are respectively parallel with the first side, the second side, the third side and the fourth side of the first opening.

10. The antenna of claim 1, wherein at least one of the first feed line and the second feed line is a microstrip line, and a feeding direction of one of the first feed line and the second feed line is a vertical direction and a feeding direction of the other of the first feed line and the second feed line is a horizontal direction.

11. The antenna of claim 1, further comprising a first feeding structure and a second feeding structure, the first feeding structure and the second feeding structure both are located on a second surface of the dielectric layer, and an orthographic projection of the first feeding structure on the dielectric layer at least partially overlaps with an orthographic projection of the first feed line on the dielectric layer, and an orthographic projection of the second feeding structure on the dielectric layer at least partially overlaps with an orthographic projection of the second feed line on the dielectric layer.

12. The antenna of claim 11, wherein the first feeding structure and the first feed line are located in a same layer and are electrically connected to each other; the second feeding structure and the second feed line are located in a same layer and are electrically connected to each other.

13. The antenna of claim 11, wherein a plurality of the first opening are provided, and the number of the first openings is $2^n$, a first feeding unit comprises n stages of third feed lines, and a second feeding unit comprises n stages of fourth feed lines;

each third feed line at a first stage is connected with two adjacent first feed lines, and different ones of the third feed lines at the first stage are connected with different first feed lines; each third feed line at an $m^{th}$ stage is connected with two adjacent third feed lines at an $(m-1)^{th}$ stage, and different ones of the third feed lines at the $m^{th}$ stage are connected with different ones of the third feed lines at the $(m-1)^{th}$ stage;

each fourth feed line at the first stage is connected with two adjacent second feed lines, and different ones of the fourth feed lines at the first stage are connected with different second feed lines; each fourth feed lines at the $m^{th}$ stage is connected with two adjacent fourth feed lines at the $(m-1)^{th}$ stage, different ones of the fourth feed lines at the $(m-1)^{th}$ stage are connected with different ones of the fourth feed lines at the $m^{th}$ stage; wherein n is greater than or equal to 2, m is greater than or equal to 2 and less than or equal to n, and both m and n are integers;

at least one of the third feed line and the fourth feed line is a microstrip line.

14. The antenna of claim 11, wherein the first electrode comprises a main body portion, a first branch, and a second branch, the first branch and the second branch are respectively connected to two sides of the main body portion in a length direction; the antenna further comprises a first connection line and a second connection line; the first connection line is connected with the first feeding structure, and an orthographic projection of the first connection line on the dielectric layer is located in an orthographic projection of the first branch on the dielectric layer; the second connection line is connected with the second feeding structure, and an orthographic projection of the second connection line on the dielectric layer is located in an orthographic projection of the second branch on the dielectric layer;

an extending direction of the first connection line is perpendicular to an extending direction of the second connection line, and an included angle between the first connection line and the first feed line is 45°.

15. The antenna of claim 11, wherein the antenna is divided into a feed region and a radiation region; the first feeding structure and the second feeding structure are located in the feed region; the radiating structure is located in the radiation region; the first electrode further has at least one second opening located in the feed region; an orthographic projection of the second opening on the dielectric layer is not overlapped with orthographic projections of the first feeding structure and the second feeding structure on the dielectric layer.

16. The antenna of claim 1, wherein the dielectric layer is a single-layer structure and made of polyimide or polyethylene terephthalate.

17. The antenna of claim 1, wherein the dielectric layer comprises a first dielectric sub-layer, a first bonding layer, and a second dielectric sub-layer which are sequentially stacked;

the first electrode is arranged on a side, away from the first bonding layer, of the first dielectric sub-layer; the second electrode is arranged on a side, close to the first sub-first dielectric layer, of the first bonding layer; and the third electrode is arranged on a side, away from the first bonding layer, of the second dielectric sub-layer, wherein a material of the first dielectric sub-layer and/or the second dielectric sub-layer comprises polyimide or polyethylene terephthalate.

18. A communication system, comprising the antenna of claim 1.

19. The communication system of claim 18, further comprising:

a transceiving unit configured to transmit or receive a signal;

a radio frequency transceiver, which is connected with the transceiving unit and configured to modulate the signal transmitted by the transceiving unit or demodulate the signal received by the antenna and then transmit the signal to the transceiving unit;

a signal amplifier, which is connected with the radio frequency transceiver and is configured to improve a signal-to-noise ratio of the signal output by the radio frequency transceiver or the signal received by the antenna;

a power amplifier, which is connected with the radio frequency transceiver and is configured to amplify power of the signal output by the radio frequency transceiver or the signal received by the antenna; and a filtering unit, which is connected with the signal amplifier, the power amplifier and a transparent antenna, and is configured to filter the received signal and then transmit the filtered signal to the transparent antenna or filter the signal received by the antenna.

20. A method for manufacturing an antenna, comprising:

providing a dielectric layer;

forming a pattern comprising a first electrode on a side of the dielectric layer through a patterning process, wherein a first opening is formed in the first electrode;

forming at least one radiating structure, at least one first feed line and at least one second feed line on a side of the dielectric layer opposite to that formed with the first electrode thereon; each radiating structure comprises a second electrode and a third electrode, wherein orthographic projections of the second electrode and the third electrode on the dielectric layer are located in an orthographic projection of the first opening on the dielectric layer, and the orthographic projection of the second electrode on the dielectric layer is not overlapped with the orthographic projection of the third electrode on the dielectric layer; the first feed line is configured to feed power to the second electrode, the second feed lines is configured to feed power to the third electrode, and a feeding direction of the first feed line is different from a feeding direction of the second feed line.

* * * * *